United States Patent Office 3,374,081
Patented Mar. 19, 1968

3,374,081
PRECIPITATION OF MINERALS FROM BRINES
John J. Miller, West Chicago, Ill., assignor to Ocean Minerals, Inc., West Chicago, Ill., a corporation of Illinois
No Drawing. Continuation-in-part of application Ser. No. 158,607, Dec. 11, 1961, which in turn is a continuation-in-part of application Ser. No. 836,052, Aug. 26, 1959. This application May 28, 1965, Ser. No. 459,944
9 Claims. (Cl. 71—11)

ABSTRACT OF THE DISCLOSURE

Treatment of saline water with lignin compounds, proteinaceous compounds and tannins to precipitate major and trace minerals therefrom, the lignin compounds being such materials as waste pulp digestor liquors, fibrous vegetation and decomposition products thereof, and the proteinaceous compounds being material such as compost materials.

---

This application is a continuation-in-part of my co-pending application Ser. No. 158,607, now abandoned, which in turn was a continuation-in-part of my copending application Ser. No. 836,052, filed August 26, 1959, now abandoned.

The present invention relates to the separation of minerals and mineral compounds from natural and synthetic brines, including sea water, bitterns, inland brines and similar saline aqueous bodies. It has long been known that vast quantities of valuable minerals, mineral salts and mineral compounds, leached from soils, are contained in sea water, brines, bitterns and other aqueous bodies both in suspension and in solution, and a considerable amount of effort has been directed to the separation of at least some of these components from such waters. For centuries, sodium chloride has been obtained from sea water by evaporation, in varying degrees of purity dependent somewhat upon the methods practiced. In recent years a few other salts or minerals have been individually recovered from sea water in commercial processes and among these salts and minerals are magnesium, bromine, iodine, and compounds thereof.

To the best of my knowledge, however, no one has heretofore economically separated from the above mentioned aqueous bodies a mixture, substantially sodium free, of all or most of the minerals carried by such waters. My invention is therefore directed to the separation of such mixtures by economically feasible processes.

The general object of my invention is to provide a process for treating brines, either natural or synthetic, for separating the minerals and mineral compounds thereof economically.

A further object of the invention is to provide a process for precipitating complexed and chelated compounds of the major mineral constituents and the trace minerals of saline aqueous systems.

Another object of the invention is to provide a method for providing an economical reagent which can be used to complex or chelate mineral constituents in brines.

Another object of the invention is to provide a mineral precipitate which is suitable for use in or with fertilizers and feeds for animals and poultry.

Other and further objects and features of the invention will be apparent from the following specific description.

By the term "trace mineral" in the present invention is meant those minerals which occur in brines in relatively small amounts, including, for example, mineral compounds containing the elements iron, aluminum, silicon, cobalt, titanium, copper, lead, vanadium, manganese, chromium, germanium, gold, iodine, bromine, boron, molybdenum, zinc, nickel and silver. By the term "major minerals" is meant those minerals that occur in brines in larger amounts than in the case of the trace minerals but substantially in lower amounts than sodium chloride. The major minerals include, for example, the mineral compounds containing the elements magnesium, strontium, nitrogen, sulfur, calcium, phosphorus and potassium.

The above lists of minerals are merely exemplary, as other minerals are found in varying proportions in many ocean waters, and whether classified as major or trace it is immaterial so far as this invention is concerned.

In accordance with the present invention I employ reagents containing materials such as proteins, proteinaceous compounds such as amino acids, lignins, and/or tannins to effect precipitation of the minerals. Such reagents may be purchased on the market, or may be produced by a novel synthesis which will be described in a succeeding portion of this specification. Prior to the use of the precipitating reagent, the saline solution may or may not be subjected to partial evaporation by known evaporating methods. If the solution has a large sodium chloride concentration, as is true of sea water, the evaporation may be conducted in a manner to obtain one or more yields of crystallized sodium chloride, to be separated from the solution before precipitation of the minerals is attempted.

While the process of the present invention is particularly applicable to the treatment of naturally occurring saline waters, it is also possible to use the reagent herein described to precipitate, as complexes or chelates, mineral constituents from a synthetically prepared brine which need not contain sodium chloride and in which the components are in a sterile condition. Complexed and chelated minerals of high purity are obtained by this method, suitable for use in pharmaceuticals.

The lignin compounds may be obtained from various sources, among which are digestor liquors, which are a waste product of chemical pulp-making processes common in the papermaking industries. These liquors may be utilized in the process either in concentrated or unconcentrated form. Also, lignin derived from such liquors or from various lignin-containing fibrous vegetation or decomposition products thereof may be used to supplement them or used in lieu of digestor liquors. While the proportion of digestor liquor and/or lignin relative to the sea water does not appear to be critical, at least enough of it in combination with the other reagents mentioned hereinafter will be used to effect precipitation of a combined precipitate whose mineral content on subsequent analysis will bear a close relationship to the relative proportions and total quantities of all the minerals known to be present in the sea water before treatment, with the exception of sodium. More than such proportions of the reagents is not known to be detrimental except with respect to a needless increase in the cost of operation.

Tannic acid and tannins for use in this process may be obtained from various sources and need not have the high purity which other processes employing tannic acids and tannin may require, especially when the product of the invention is to be used in fertilizers and not for edible purposes, that is, they may be unrefined. As used hereinafter the term "tannin" will be understood to refer to all tannin compounds procured from any source.

According to one method of the present invention inland brine or sea water is subjected to concentration by evaporation, for example, by solar evaporation or evaporation with the application of other forms of heat, either at atmospheric pressure or at reduced pressure, in any suitable equipment, for example, evaporating pans or multiple-stage evaporators, until the concentration ratio (i.e., the ratio of the volume of the original liquor to the volume of the concentrated liquor) is approximately 5.5–7:1. The salt (chiefly sodium chloride) which separates after the concentration is accomplished is isolated in any desired manner, for example, by filtration or decantation. The remaining liquor is then subjected to a second concentration until the second concentration ratio (i.e., the ratio of the volume of the liquor from the first concentration to the volume of the liquor after the second concentration) is approximately 1.7–8:1. The salt (chiefly sodium chloride) which separates after this concentration is isolated. To the remaining liquor is then added a precipitating agent in the amount of 0.5–5% by weight of the solids in the liquor. I have found that proteinaceous materials recovered from the enzymatic treatment of organic waste products of vegetable and animal origin, lignins, or tannins or mixtures of these materials possess the property of precipitating the trace minerals and major minerals in the concentrated liquor. Dry sodium lignin from pine (known in the trade as Indulin C) is a particularly effective precipitating agent. Dry lignin from pine (known in the trade as Indulin A) is also very effective when solubilized by treatment with ammonium hydroxide or converted to the sodium or potassium salt by treatment with sodium or potassium hydroxide. As an alternative to direct solubilization of the lignin, I may render the concentrated liquor containing the trace minerals and major minerals alkaline with the addition of ammonium hydroxide and then add the dry lignin to the liquor. When tannins are employed with the lignin, the preferred ratio of lignin to tannic acid is 1:1, although substantially smaller or larger quantities of tannins may be employed.

I have established that proteinaceous materials resulting from enzymatic or bacterial degradation of vegetation composts, humus, animal manure, slaughter house by-products, sewage, sewage sludge, garbage, fish by-products, and yeasts are very effective precipitating agents.

A particularly preferred reagent for use in the process of the present invention results from the composting of vegetable waste materials such as waste from grape pressing operations, including seeds and skins, refuse from sugar beets and spinach, alfalfa, weeds, cotton lint, cotton seed hulls, leaves, and the like. Such materials may be spread out in the open and mixed to initiate the composting. Periodically, the mass is wet with water. The composting occurs due to the presence of both aerobic and anaerobic bacteria as well as naturally occurring yeasts, principally actinomyces and mycelia which occur naturally in the vegetable waste materials. During composting, the temperature of the mass rises, driving out substantial amounts of moisture so that the finished product contains only about 15 to 20% moisture. During composting, as the temperature climbs to 145° F., the material is turned periodically to expose new surfaces to the air. Ordinarily, two to four weeks are required for producing the product, depending on weather conditions. The completion of the composting reaction is evidenced by the presence of a uniform grayish color in the product. This material is then ground in a hammermill or the like and sieved to a uniform particle size, whereupon it can be used directly in the precipitation of the mineral constituents of brines.

As an example, of this form of the process, as applied to unconcentrated ocean water or other brines containing considerable sodium chloride in solution as well as the sought for major and trace minerals, I prepared an aqueous solution or suspension containing about 1 gram of waste sulfite liquor solids, 2 grams of dried lignin and 2 grams of proteinaceous compound solids obtained by the procedure recited above. This aqueous solution was mixed with about 200 cc. of ocean water at a temperature preferably above 65° F. and below 140° F. The precipitate began to form promptly, after which one-tenth to one-fifth of a gram of tannic solids previously dissolved in water was added to the mixture. Within 20 to 30 minutes a commercially adequate yield of precipitate was formed. This precipitate was then filtered and dehydrated.

While this precipitate may be segregated by filtering or decantation methods, I may also separate it by centrifuging, after which the solids may be further dried by conventional methods.

The precipitate obtained as above described has been analyzed, and the analysis reveals the various major and trace minerals, substantially free of sodium chloride, in about the same proportions they maintained in the original ocean water. However, the yield in grams of such minerals relative to their respective initial quantities in the unconcentrated ocean water is much greater when the amino compounds are used as compared to precipitation without using amino compounds.

The effluent from the above contained sodium chloride and other sodium salts.

The above example was repeated on ocean water previously concentrated as heretofore described, and a similar improvement in minerals yield was observed.

The desired precipitation occurs best when the pH of the brines under treatment is in the range of 6 to 9.5, which is normal for ocean water. If needed in the processing of any of the brines, ammonia or other suitable alkalis may be employed to adjust the pH of this range.

As a further example, illustrating the use of the minerals recovered from the composting procedure, 100 cc. of ocean water was warmed to the range of 70° F. to 90° F., and thereafter 6 cc. of the reagent was added. Then, 1½ cc. of fixing agent were introduced with mixing. The fixing agent was made by mixing mono ammonium phosphate and di-ammonium phosphate in approximately equal parts, and adding fresh water to give a saturated solution. This solution of ammonium phosphate was then diluted by five parts of water. Alternatively, the fixing agent may be prepared by adding phosphoric acid to either anhydrous ammonia or to aqueous ammonia.

Upon mixing of the ocean water, reagent, and fixing agent, and then cooling, a precipitate formed rapidly, leaving a clear colorless supernatant liquid containing sodium chloride.

The chemical or physical condition, or both, of the precipitate obtained in accordance with my invention may be in the nature of compounds and complexes which include the organic materials employed as reagents and the minerals and mineral compounds derived from the brines.

The addition of the precipitating agents results in the formation of a voluminous precipitate containing the trace minerals, major minerals and the precipitating agent. The time for completion of precipitation is dependent on the pH of the liquor. In general, precipitation is heavier when the pH of the liquor is higher but coagulation and settling of the precipitate is much slower. Coagulation at the normal pH of the brine (about pH 8.0) is quite rapid, whereas coagulation at the pH of 7.0 requires from 24 to 36 hours for completion. In general, the quantity of precipitate at the higher pH is approximately double that obtained at the lower pH.

After coagulation, the precipitate is removed from the liquor by any desired means, for example, by filtration, and may be washed with water and dried. The trace mineral precipitate containing the precipitating agent is difficult to handle when dry, inasmuch as it is quite hygroscopic. The precipitate may be subjected to pyrolysis (i.e., ashed) to remove the organic matter. The ashed minerals are also hygroscopic.

The following additional examples will serve to illustrate the methods and products of the present invention:

*Example I*

Inland (Ohio) brine (14 L) was concentrated by evaporating in heated pans to a volume of 6.1 liters and the liquor was cooled to approximately room temperature (25° C.). The salt (chiefly sodium chloride) which separated was removed by filtration. The liquor was then further concentrated by evaporation to a volume of 2.88 liters and cooled to approximately room temperature. The salt (chiefly sodium chloride) which separated from the second concentration was also filtered off.

To the remaining liquor was added a sulfite waste liquor concentrate (80 g., dry basis) and the concentrated liquor was stirred and allowed to stand for twenty-four hours. The precipitate which formed was filtered off, washed with a small quantity of cold water and dried. The dried precipitate weighed 125 g.

The process was repeated (Run No. 2) using 13.88:1 of the same inland brine and dry lignin from pine (known to the trade as Indulin A) in place of lignin residue from sulfite waste liquor and rendering the concentrated liquor basic with ammonium hydroxide prior to the addition of the lignin thereto. The addition of ammonium hydroxide had the effect of precipitating the magnesium as magnesium hydroxide and also of solubilizing the lignin. The results of both runs are shown in Table I:

TABLE I

| Inland (Ohio) Brine No. 3 | Run No. 1 | Run No. 2 |
|---|---|---|
| Original volume (liters) | 14.00 | 13.80 |
| Volume after 1st concentration (liters) | 6.1 | 5.2 |
| Concentration ratio | 2.29:1 | 2.65:1 |
| Volume after 2nd concentration (liters) | 2.88 | 2.80 |
| Concentration ratio | 2.14:1 | 1.89:1 |
| Weight of salt-1st concentration (grams) | 1,900.0 | 2,086.0 |
| Weight of salt-2nd concentration (grams) | 973.0 | 425.0 |
| Total salt removed (grams) | 2,873.0 | 2,411.0 |
| Density, final concentration | 1.425 | 1.405 |
| Reagent added (grams) | 80.0 | 80.0 |
| Type reagent | Lignin | Indulin A |
| Precipitate (grams) | 125.0 | 1,409.0 |
| Sodium, original (1%) | 5.35 | 5.35 |
| Sodium, after concentration (1%) | 14.0 | 13.5 |
| Sodium, after precipitation (1%) | 9.8 | 10.0 |
| Solids, original (1%) | 69.5 | 64.2 |
| Solids, after precipitation (1%) | 69.0 | 57.5 |

*Example II*

A series of runs was made according to the procedure described in Example I for the concentration of the brine through evaporation in order to ascertain the effective concentration ratios relative to the recovery of salt from the concentration operation. The results are shown in Table II:

TABLE II

| Inland (Ohio) Brine No. 2 | Run No. 1 | 2 | 3 | 4 | 5 |
|---|---|---|---|---|---|
| Original volume (liters) | 13.24 | 12.75 | 13.50 | 13.36 | 13.76 |
| Volume after 1st concentration (liters) | 2.18 | 2.31 | 2.10 | 1.90 | 2.38 |
| Concentration ratio | 6.07:1 | 5.50:1 | 6.42:1 | 7.03:1 | 5.78:1 |
| Volume after 2nd concentration (liters) | 1.10 | 1.99 | 0.63 | 0.25 | 1.00 |
| Concentration ratio | 1.98:1 | 1.76:1 | 3.34:1 | 7.6:1 | 2.38:1 |
| Weight of salt recovered from 1st concentration (grams) | 347.7 | 192.4 | 217.5 | 354.7 | 305.9 |
| Weight of salt recovered from 2nd concentration (grams) | 307.8 | 395.8 | 411.1 | 514.0 | 412.6 |
| Density, final concentrate | 1.230 | 1.225 | 1.249 | 1.254 | |
| Total salt removed | 655.6 | 688.2 | 628.6 | 868.7 | 718.5 |

The results of the series of runs indicate that where pre-concentration is desirable, the concentration ratio on the initial concentration may vary from approximately 5.5:1 to approximately 7:1, and the second concentration ratio from approximately 1.7:1 to approximately 8:1, with comparable results in respect to salt recovery.

*Example III*

A series of runs was made on the concentrated liquor from the evaporation described in Example II after the removal of salt to determine the effectiveness of precipitation with lignin-tannin agent relative to the recovery of trace minerals and major minerals. This concentrated liquor was adjusted in pH to 7.0 by the addition of ammonium hydroxide before the addition of the precipitating agent. A weighed quantity of agent (equal parts by weight of lignin and tannic acid) was added to a portion of the liquor. The liquor was agitated and then allowed to stand overnight. The precipitate was filtered off, dried in an oven and weighed. A similar additional quantity of agent was then added to the filtered solution and the same procedure was followed. This procedure was repeated three times and the precipitates from the respective runs were ashed and analyzed spectrographically. Table III shows the weights of precipitate obtained and Table IV shows the identity and amount of the respective trace minerals and major minerals found to be present in the ashed precipitate.

TABLE III

| Precipitate No. | Weight (g.) of Reagent | Weight (g.) of Precipitate | Weight (g.) of Ash |
|---|---|---|---|
| 1 | 20 | 44.0 | 16.0 |
| 2 | 20 | 81.1 | 56.0 |
| 3 | 20 | 78.2 | 49.3 |

TABLE IV

| Element | Percentage of Elements in Ash Samples | | |
|---|---|---|---|
| | Ash No. 1 | Ash No. 2 | Ash No. 3 |
| Calcium | Major | Major | Major |
| Sodium | Major | Major | Major |
| Iron | 0.1–1.0 | 0.03–0.3 | 0.01–0.1 |
| Magnesium | 0.1–1.0 | 0.1–1.0 | 0.1–1.0 |
| Strontium | 0.05–0.5 | 0.03–0.3 | 0.05–0.5 |
| Aluminum | 0.03–0.3 | 0.01–0.1 | 0.001–0.01 |
| Silicon | 0.03–0.3 | Trace | |
| Cobalt | 0.01–0.1 | 0.0001–0.001 | |
| Potassium | 0.01–0.1 | 0.01–0.1 | 0.01–0.1 |
| Copper | 0.005–0.05 | 0.001–0.1 | 0.005–0.05 |
| Lead | 0.005–0.05 | 0.001–0.01 | 0.001–0.01 |
| Vanadium | 0.001–0.01 | 0.001–0.01 | |
| Manganese | 0.001–0.01 | 0.001–0.01 | 0.001–0.01 |
| Chromium | 0.001–0.01 | 0.005–0.05 | 0.001–0.01 |
| Boron | 0.001–0.01 | | |
| Nickel | 0.005–0.05 | Trace | |
| Silver | Trace | Trace | |

With reference to the data in Tables III and IV, it is apparent that the initial precipitation yields a larger number of trace minerals and major minerals than do the subsequent precipitations. This technique is useful in effecting the recovery of trace mineral and major mineral concentrates of varying composition. As plant nutrients, trace mineral and major mineral compositions such as that reported in Ash Nos. 1, 2 and 3 may be found particularly desirable for certain soils in which the absence of selenium is essential to the welfare of the vegetation to be grown in the soil. For the purpose of recovering the maximum number of trace and major elements from the concentrated liquor, the effectiveness of the initial precipitation is important. The residual liquor after removal of the precipitate was found to contain a substantial concentration of anion values, such as bromides, iodides, sulfates, nitrates and phosphates. This liquor represents a source of such anions from which the recovery of bromine and iodine may be effected and also the recovery of the remaining anions. As an alternative, the liquor may be employed as such for the anion values contained therein, for example, as a plant nutrient solution for the enhancement of soil fertility.

Example IV

A series of precipitation runs was made on the concentrated liquor from the runs described in Example I, using various amounts of lignin and tannic acid to determine the relative merits of (a) increasing quantity of reagent and (b) increasing the ratio of lignin to tannic acid on the quantity of precipitate obtained. The precipitation was undertaken according to the procedure of Example I. The results of these runs are shown in Table V.

TABLE V

| Concentrated Liquid From Inland (Ohio) Brine No. 3 | Ratio Lignin:Tannic Acid | Weight (g.) of Precipitate |
| --- | --- | --- |
| Run No. 1 | 2:1 | 89 |
| Run No. 2 | 3:1 | 113 |
| Run No. 3 | 1:0 | 46 |
| Run No. 4 | 1:0 | 138 |
| Run No. 5 | 6:1 | 89 |

The results of this series of runs indicate that lignin is a satisfactory precipitating agent without the addition of tannic acid provided that the lignin selected for this purpose possesses precipitating characteristics of the order of that exhibited by sodium lignin from pine. Lignin from sulfite waste liquor is more effective as a precipitating agent when employed with tannic acid. As further evidence of the effectiveness of sodium lignin from pine as a precipitating agent for trace minerals and major minerals in concentrated liquors, Table VI shows a comparison of the amount of precipitate and weight of ash obtained when lignin from sulfite waste liquor is employed in comparison with that obtained when sodium lignin from pine is employed.

TABLE VI

| Type of Lignin | Weight (g.) of Precipitate | Weight (g.) of Ash |
| --- | --- | --- |
| Lignin from sulfite waste liquor | 135 | 91 |
| Sodium lignin from pine | 490 | 293 |

Example V

A portion of the trace mineral and major mineral precipitate (100 g.) from Run No. 2 shown in Table I, Example I, was blended with a feed for cattle (1000 g.). The resulting feed was found to be effective as a mineral-fortified feed for cattle.

Example VI

A portion of the trace mineral and major mineral precipitate (100 g.) from Run No. 2 shown in Table I, Example I, was blended with vermiculite (1000 g.). The resulting mixture was employed as a fertilizer in hothouse beds. The results in terms of increased growth and height of the plants grown in the bed were an indication of the effectiveness of the composition for the purpose of enhancement and sustainment of soil fertility.

Example VII

One-liter portions of concentrated sea water from which the salt (chiefly sodium chloride) had been removed were treated respectively with concentrated lignin, a mixture of lignin and crude tannic acid, and crude tannic acid. The precipitate which formed was filtered off, washed with water and dried. The results are shown in Table VII.

TABLE VII

| Concentrated Sea Water (salt removed) | Precipitating Lignin | Agent (Grams) Tannic Acid | Trace and Major Minerals Precipitated Net (dry) Wt. (g.) |
| --- | --- | --- | --- |
| 1 liter | | 100 | 95 |
| 1 liter | 50 | 50 | 310 |
| 1 liter | 100 | | 260 |

Fortunately, there are no critical ranges in the effective proportions of reagents to the brines or their mineral contents, for useful operation in accordance with this invention. Proportions between the organic reagents themselves are likewise subject to great variation, there being no known critical proportion or critical range. Those indicated are effective for economical operation, but other proportions will yield useful results.

In the precipitation of minerals from sodium chloride brines, ocean waters, etc., it was found in pilot plant tests that unless the decanting of the supernatant was fairly prompt and weather conditions favorable to stability of the precipitate, it proved advisable to add a "fixing agent" to the batch undergoing precipitation so that the precipitate would be "hardened" and decanting thereby improved. Unless this was done, the bacteria of the brines and other waters being treated—along with the enzymes present in the organic debris contained in such waters—caused some reversal of the precipitating process within a half hour to an hour if the temperature of the environment or of the solution was above approximately 70° F.

The chemical or physical condition, or both, of the precipitate obtained in accordance with my invention may be in the nature of compounds and complexes which include the organic materials employed as reagents and the minerals and mineral compounds derived from the brines.

Example VIII

The particulate extract derived from the composting of vegetable refuse matter, as previously discussed, can be used alone in the selective precipitation of divalent metals from brines. For example, ordinary sea water can be treated at temperatures of 60 to 120° F. with the proteinaceous solids recovered from composting in the ratio of 1 to 4 parts by volume of the powder to every 100 parts by volume of the sea water. The powder is first dispersed in from 4 to 7 parts by volume of tap water. After standing, a precipitate forms containing the bulk of the divalent metal values present in the sea water thereby rendering it less scale forming than in its natural state.

The precipitation of the minerals in accordance with this invention is thought to be in the nature of synergistic action, in which the desired minerals precipitate in compounds and complexes with the reagents, leaving the sodium salts in solution. When the product is employed as a fertilizer additive it supplies to the soil various minerals which are presently known to have an important place in plant metabolism and soil chemistry and biology, and thereby are important in the use of the plants and plant products in feeding both animals and humans.

The foregoing specification describes for illustrative purposes examples of the process and other details of procedure. It should be understood, however, that the invention is susceptible of considerable variation without departing from the scope of the invention defined in the appended claims.

I claim as my invention:

1. A method for the recovery of trace minerals and major minerals from concentrated brines from which a substantial proportion of sodium chloride has been removed, comprising adding a chemical precipitating agent selected from the group consisting of proteinaceous materials resulting from the enzymatic degradation of organic matter, lignin, and tannins to the resulting solution, allowing the solution to stand until precipitation of said minerals is substantially complete and separating the precipitate from said liquor.

2. A method of recovering sodium chloride, trace minerals and major minerals from brines comprising concentrating said brines to a volume concentration ratio in the range of 5.5–7:1, removing crystallized sodium chloride from said brines, concentrating the remaining liquor to a volume concentration ratio in the range of 1.7–8:1, separating crystallized sodium chloride from said remaining liquor, adding a mixture of lignin and tannins to said residual liquor, allowing said liquor to stand until chemical precipitation of said minerals is substantially complete, and separating the precipitate from said liquor.

3. A method of obtaining major and trace minerals from ocean water comprising mixing waste sulfite liquor, proteinaceous compounds extracted from a compost of decayed vegetable matter, and tannin with said water forming a precipitate containing the major and trace minerals combined with the added reagents, and separating the precipitate from the water.

4. As a new composition of matter, an intimate mixture of major and trace minerals found in ocean water combined with lignin compounds, proteinaceous compounds resulting from enzymatic degradation of organic matter, and tannin.

5. A method of obtaining major and trace minerals from brines comprising mixing lignin compounds, proteinaceous compounds and tannin with said brines, forming a precipitate containing the major and trace minerals combined with the added reagents, and separating the precipitate from the water, the lignin compounds utilized being those contained in any of the group consisting of waste pulp digestor liquors, fibrous vegetation and decomposition products thereof, the proteinaceous compounds utilized being those resulting from the enzymatic degradation of a member of the group consisting of animal manure, sewage, garbage, compost, humus, and fish by-products.

6. A method of obtaining major and trace minerals from brines comprising mixing lignin compounds and proteinaceous compounds with said brines, forming thereby a flocculent precipitate, adding tannin to thereby modify the precipitate into a more granular state, and separating from the water the precipitate containing the major and trace minerals combined with the added reagents, the lignin compounds utilized being those contained in any of the group consisting of waste pulp digestor liquors, fibrous vegetation and decomposition products thereof, the proteinaceous compounds utilized being those resulting from the enzymatic degradation of a member of the group consisting of animal manure, sewage, garbage, compost, humus, and fish by-products.

7. A method of obtaining major and trace minerals from brines comprising mixing at least one member of the group consisting of lignin compounds, proteinaceous compounds and tannin with said brine at a temperature between 60° F. and 140° F., forming a precipitate containing the major and trace minerals combined with the added reagents, and separating the precipitate from the water, the lignin compounds utilized being selected from the group consisting of waste pulp digestor liquors, fibrous vegetation and decomposition products thereof, and the proteinaceous compounds being those resulting from the composting of vegetable refuse matter.

8. A method of obtaining major and trace minerals from brines comprising mixing at least one member of the group consisting of lignin compounds, proteinaceous compounds and tannin with said brines at a temperature between 60° F. and 140° F. and at a pH between 6 and 9.5, forming a precipitate containing the major and trace minerals combined with the added reagents, and separating the precipitate from the water, the lignin compounds utilized being those contained in any of the group consisting of waste pulp digestor liquors, fibrous vegetation and decomposition products thereof, and the proteinaceous compounds utilized being those resulting from the composting of vegetable refuse matter.

9. A method of obtaining major and trace minerals from brines, comprising mixing lignin compounds and proteinaceous compounds resulting from the degradation of organic matter with said brines, forming thereby a flocculent precipitate, adding tannin to thereby modify the precipitate into a more granular state, adding monoammonium phosphate and diammonium phosphate to the mixture to stabilize the precipitate, and separating from the water the precipitate containing the major and trace minerals combined with the added reagents.

References Cited

UNITED STATES PATENTS 2,415,439   2/1947   Nelson _____ 210—54

DONALL H. SYLVESTER, *Primary Examiner.*

S. LEON BASHORE, *Examiner.*

R. BAJEFSKY, *Assistant Examiner.*